(12) United States Patent
Guerra et al.

(10) Patent No.: US 7,258,521 B2
(45) Date of Patent: Aug. 21, 2007

(54) CHAIN-DRIVEN ROBOTIC ARM

(75) Inventors: Lawrence E. Guerra, Mission, KS (US); Sean P. Mannell, Merriam, KS (US); Steven R. Walton, Olathe, KS (US)

(73) Assignee: Scriptpro LLC, Mission, KS (US)

( * ) Notice: Subject to any disclaimer, the term of this patent is extended or adjusted under 35 U.S.C. 154(b) by 133 days.

(21) Appl. No.: 11/141,602

(22) Filed: May 31, 2005

(65) Prior Publication Data

US 2006/0280587 A1    Dec. 14, 2006

(51) Int. Cl.
*B25J 18/02* (2006.01)
(52) U.S. Cl. .............. 414/749.1; 74/89.21; 74/490.04; 901/21
(58) Field of Classification Search ................ 414/718, 414/728, 751.1, 749.1; 901/21; 74/490.04, 74/89.21; 52/118
See application file for complete search history.

(56) References Cited

U.S. PATENT DOCUMENTS

| | | | | |
|---|---|---|---|---|
| 4,319,864 A | * | 3/1982 | Kaufeldt | 414/751.1 |
| 5,533,858 A | * | 7/1996 | Costa | 414/751.1 |
| 2002/0146304 A1 | * | 10/2002 | Yamashita et al. | 414/217 |

* cited by examiner

*Primary Examiner*—Donald Underwood
(74) *Attorney, Agent, or Firm*—Hovey Williams, LLP

(57) ABSTRACT

A robotic arm for transporting products in a product storage and dispensing system is disclosed. The robotic arm broadly includes a base operable to couple the arm to the dispensing system; a sprocket coupled with the base; an extendible arm segment coupled with the base; and a chain coupled with the sprocket and the extendible arm segment such that rotation of the sprocket causes movement of the chain and extension of the extendible arm segment. The robotic arm provides a compact and effective retrieval tool that is compatible with closely spaced and densely packed product shelves.

17 Claims, 4 Drawing Sheets

CHAIN-DRIVEN ROBOTIC ARM

BACKGROUND OF THE INVENTION

1. Field of the Invention

The present invention relates to the field of medicament dispensing systems. More particularly, the invention relates to a chain-driven robotic arm for use in a system that automatically stores and dispenses pre-packaged pharmaceutical products and other products, wherein the robotic arm is compatible with closely spaced, densely packed product shelves.

2. Description of the Related Art

Pharmacists spend an increasing amount of time educating patients about proper use and handling of medicaments and pharmaceuticals. While this trend toward more patient counseling increases patients' knowledge about medicaments and decreases improper use of medicaments, it leaves less time for pharmacists to fill and dispense medicaments.

Automatic medicament dispensing systems have been developed to assist pharmacists in filling and dispensing prescriptions and to therefore have more time for patient counseling. Some of these systems are effective for filling and dispensing medicaments in the form of pills and capsules, but they are not designed to dispense larger pre-packaged pharmaceuticals. Pharmacists in many areas dispense large quantities of pre-packaged boxes and/or bottles of pharmaceuticals and currently must manually locate and dispense these items, reducing the amount of time those pharmacists have for patient counseling.

Another problem with manually locating and dispensing pre-packaged pharmaceuticals is that errors are sometimes made. For example, many boxes of pre-packaged pharmaceuticals look alike even though they have different strengths or quantities of medicaments therein. Pharmacists therefore occasionally locate and dispense the wrong box. Such errors can obviously have serious consequences for patients receiving such products.

Additionally, as some packages of pharmaceuticals may be of different sizes and/or shapes, mechanical devices often have difficulty gripping individual packages. Furthermore, in gripping a package, a mechanical device may disturb other packages, making future retrieval of those disturbed packages more difficult.

Automated systems have been developed which more effectively store products on shelves. One such medicament storage system is disclosed in U.S. Pat. No. 6,883,681, entitled "AUTOMATIC DISPENSING SYSTEM FOR UNIT MEDICAMENT PACKAGES", filed Dec. 8, 1999, and incorporated into the present application by reference. This system includes a product transporter with a conveyor belt on the transporter. The transporter acquires a product when positioned so that an end of the transporter conveyor belt is proximate, for example, an end of an infeed conveyor belt. The product is transferred from the infeed conveyor belt to the transporter conveyor belt when both belts are rolling in the same direction so that the product engages the transporter conveyor belt as it reaches the end of the infeed conveyor belt. While this system is effective for use with certain products, it is not ideal for use with products contained in narrow packages that may wobble and/or overturn as they encounter a narrow gap when passing from one conveyor belt to another, disrupting the storing or dispensing process.

Furthermore, many automated systems are not adapted to store products on shelves so that the products are in close proximity to each other. Gripping arm mechanisms such as the manipulator arm and gripping fingers of known devices are not well adapted for reaching onto a shelf, particularly a deep shelf, to place or remove a product. While similar arms with greater length may be used to reach farther onto a shelf, such a design reduces the number of products that can be stored on the shelf.

An arm with greater reach requires more lateral shelf space to operate, which requires the products to be stored farther apart. As the length of the arm increases, so does the radius of curvature of the path followed by the end of the arm. Similarly, if the arm is made to pivot up and away from a shelf, the shelves must be placed further apart to accommodate the swing path of the arm. Accommodating the increased operating space of such systems results in less densely packed products, product shelves spaced farther apart, and/or shelves with less depth.

Various approaches have been implemented in an attempt to overcome some of these problems. For example, co-pending U.S. patent applications entitled "ROBOTIC ARM FOR USE WITH PHARMACEUTICAL UNIT OF USE TRANSPORT AND STORAGE SYSTEM"; Ser. No. 10/996,256, filed Nov. 23, 2004, and "FORK BASED TRANSPORT STORAGE SYSTEM FOR PHARMACEUTICAL UNIT OF USE DISPENSER", Ser. No. 10/896,477, filed Jul. 22, 2004, both of which are incorporated herein by reference, each disclose various medicament retrieval apparatuses. However, these approaches often rely on pivoting arms that require increased mechanical complexity and precise orientation.

SUMMARY OF THE INVENTION

The present invention solves the above-described problems and provides a distinct advance in the art of automatic medicament dispensing systems. More particularly, the present invention provides a chain-driven robotic arm for use in a system that automatically stores and dispenses pre-packaged pharmaceutical products and other products, wherein the robotic arm is compatible with closely spaced, densely packed product shelves.

In one embodiment, the present invention provides a robotic arm for transporting products in a product storage and dispensing system. The robotic arm broadly includes a base operable to couple the arm to the dispensing system; a sprocket coupled with the base; an extendible arm segment coupled with the base; and a chain coupled with the sprocket and a distal end of the extendible arm segment such that rotation of the sprocket causes movement of the chain and extension of the extendible arm segment.

In another embodiment, the robotic arm broadly comprises a base including an arcuate channel, the base being operable to couple the arm to the dispensing system; a sprocket coupled with the base; a motor coupled with the sprocket and operable to rotate the sprocket in a first direction and a second direction; an extendible arm segment coupled with the base having an engagement mechanism; and a chain coupled with the sprocket and the engagement mechanism.

The extendible arm segment additionally includes a plurality of telescoping segments operable to inwardly and outwardly telescope. The chain is coupled with the engagement mechanism such that rotation of the sprocket in the first direction causes movement of the chain and outward telescoping of the telescoping segments to extend the extendible arm segment. Rotation of the sprocket in the second direction causes reverse movement of the chain and inward telescoping of the telescoping segments to retract the extendible arm segment. The chain is also at least partially housed in the arcuate channel when the extendible arm segment is retracted In another embodiment, the robotic arm broadly comprises a base including an arcuate channel and a slot, the base being operable to couple the arm to the dispensing system; a sprocket coupled with the base; a motor coupled with the sprocket and operable to rotate the sprocket in a first direction and a second direction; an extendible arm segment coupled with the base having an engagement mechanism; and a chain coupled with the sprocket and the engagement mechanism.

The extendible arm segment additionally includes a plurality of telescoping segments operable to inwardly and outwardly telescope, the plurality of telescoping segments having a first end and a second end. The engagement mechanism is coupled to the telescoping segments at the first end and is operable to engage a product. The engagement mechanism is also housed at least partially in the slot when the extendible arm segment is retracted. The extendible arm segment additionally includes a slidable arm mount coupled to the telescoping segments at the second end and is operable to couple the extendible arm segment to the base. The slidable arm mount is positioned at least partially in the slot for sliding therein.

The chain includes a plurality of stops to restrict bending of the chain during operation and loading. The chain is also at least partially housed in the arcuate channel when the extendible arm segment is retracted. The chain is coupled with the sprocket and the engagement mechanism such that rotation of the sprocket in the first direction causes movement of the chain, forward sliding of the slidable arm mount, and outward telescoping of the telescoping segments to extend the extendible arm segment. Rotation of the sprocket in the second direction causes reverse movement of the chain, rearward sliding of the slidable arm mount, and inward telescoping of the telescoping segments to retract the engagement mechanism.

These and other aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
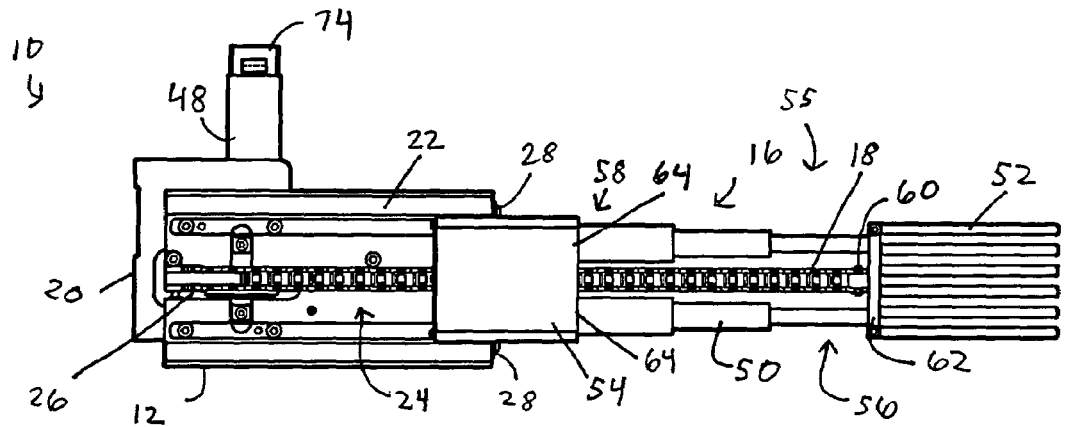
FIG. 1 is a top view of a chain-driven robotic arm constructed in accordance with the principals of a preferred embodiment of the present invention.

Referring to FIGS. 1-8, an exemplary robotic arm employing the principles of the present invention is shown and designated generally by the reference numeral 10. The arm 10 preferably engages and transports products as part of a product storage and dispensing system 200. For example, the arm 10 may be used to store and dispense pre-filled bottles or vials of medicaments filled by an automatic medicament dispensing system such as the SP 200 medicament dispensing system manufactured and sold by ScriptPro LLC of Mission, Kans. However, the arm 10 may be utilized as part of any manual or automated system to facilitate retrieval or manipulation of objects.

The arm 10 broadly comprises a base 12 operable to mount the arm 10 to the dispensing system 200, a sprocket 14 coupled with the base 12, an extendible arm segment 16 coupled with the base 12 for engaging a product, and a chain 18 coupled with the sprocket and the extendible arm segment 16 to extend and retract the extendible arm segment 16 for the manipulation of objects such as medicament packages.

The base 12 includes a mounting bracket 20 to generally secure the base 12 to a drive assembly 202, other structural element of the dispensing system 200, or other apparatus. The mounting bracket 20 may include one more apertures, grooves, slots, clamps, combinations thereof, etc, to secure the base 12 to the dispensing system 200 or other apparatuses. Additionally, the mounting bracket 20 may enable the arm 10 to be fixedly or removably attached to dispensing system 200 through the use of generally conventional disengageable fasteners.

The base 12 generally provides a foundation on which the other components of the arm 10 may be coupled with. The base 12 includes a generally flat top 22 to which the extendible arm segment 16 is mounted or otherwise coupled. The top 22 also includes a longitudinal slot 24 for reception of at least a portion of the extendible arm segment 16 and at least one opening 26 to enable the chain 18 to pass through the top 22. The longitudinal slot 24 preferably extends throughout the top 22 and includes one or more slot stops 28 for restricting movement of the extendible arm segment 16 within the slot 24. Additionally, the slot 24 preferably includes a pair of opposed L-shaped flanges for securely engaging various elements of the arm 10 described below.

The base 12 further includes right and left opposed sides 30, 32. The right side 30 includes an arcuate channel 34 operable to house at least a portion of the chain 18, as is described below. The arcuate channel 34 may be enclosed entirely within the base 12 or only a portion of the arcuate channel 34 may be positioned within the base 12 as is shown in FIGS. 1-3.

Figure 4:
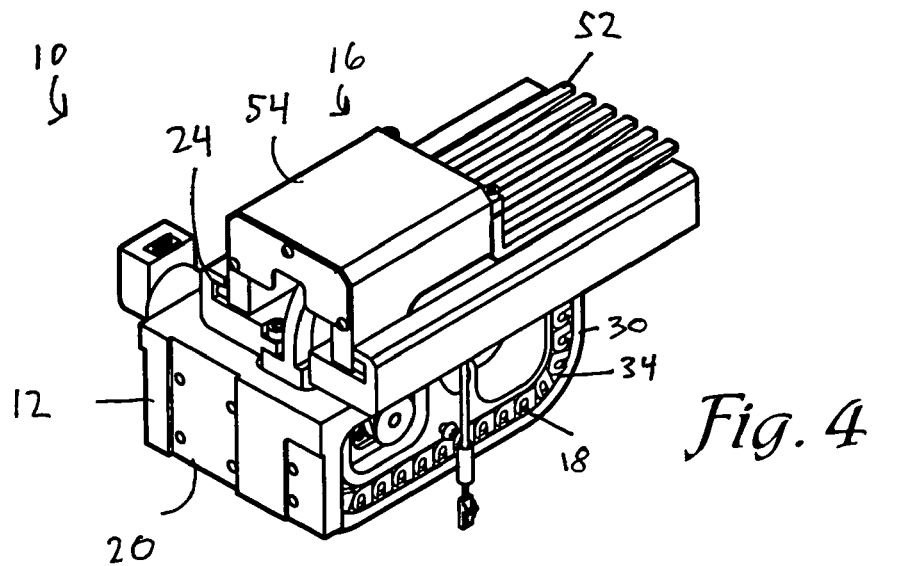
FIG. 4 is a perspective view of the arm of FIGS. 1-3 showing the arm in a retracted position.

Preferably, the length of the arcuate channel 34 generally corresponds to the length of the chain 18, such that the chain may be at least substantially, if not fully, housed within the arcuate channel 34. For example, the chain 18 may be housed within the arcuate channel 34 when the arm 10 is in a generally retracted state as shown in FIG. 4. The curvature of the arcuate channel 34 enables the chain 18 to be compactly housed within the base 12 without requiring the base 12 to have a length that corresponds to the length of the chain 18. Such a configuration may be desirable in various situations as it enables the arm 10 to be compactly constructed without inhibiting the reach of the extendible arm segment 16.

Figure 2:
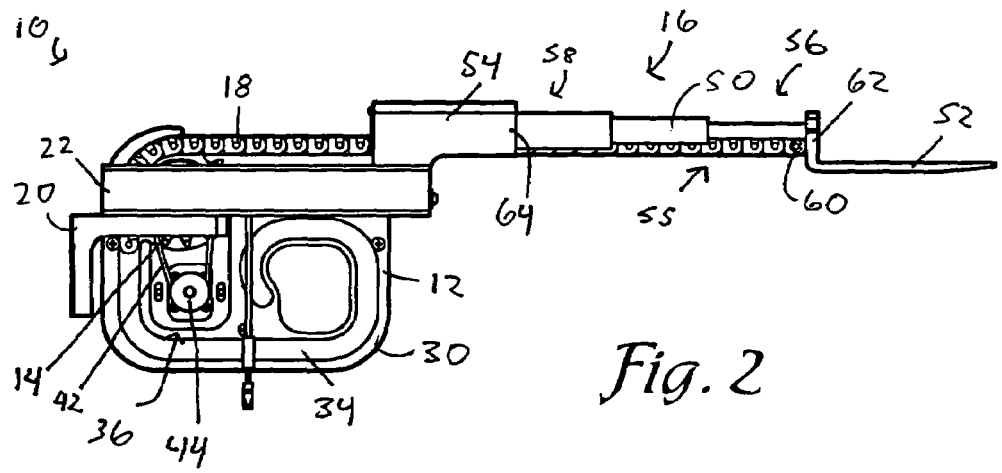
FIG. 2 is a side view of the arm of FIG. 1.
Figure 3:
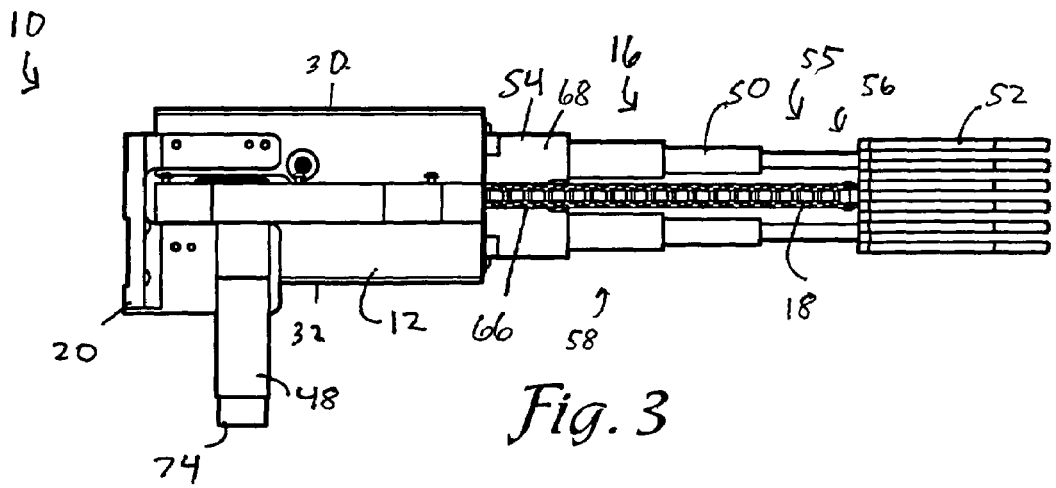
FIG. 3 is a bottom view of the arm of FIGS. 1-2.

As shown in FIG. 2, the arcuate channel 34 is preferably comprised of at least four generally 90-degree turns separated by a distance represented by at least four links of the chain 18. Such a configuration enables compact housing of the chain 18 within the channel 34 without inhibiting the movement of the chain within and through the channel 34. However, those skilled in the art will appreciate that various other configurations may be employed to house the chain 18 in a compact manner within the arcuate channel 34, such as by presenting generally spiral or rectangular configurations of the arcuate channel 34.

Additionally, the arcuate channel 34 may be positioned on the left side 32 in various configurations orthe arcuate channel 34 may be included on both the sides 30, 32 such that the arcuate channel 34 generally bisects the base 12. In addition to the arcuate channel 34, the sides 30, 32 preferably include one or more passthroughs 36 to enable one or more drive shafts, coupling elements, or various other elements of the arm 10 to pass through the base 12.

The sprocket 14 is coupled with the base 12 to provide an axis of rotation for the sprocket 14. Preferably, the sprocket 14 is coupled with a mounting shaft 38 that passes through one of the passthroughs 36 to couple the sprocket 14 to the base 12. However, the sprocket 14 may be coupled with the base through other methods, such as by securing the sprocket 14 with other rotating coupling elements. The sprocket 14 is coupled with the base 12 such that the sprocket 14 may rotate freely without obstruction from the base 12 or elements coupled thereto or included therein, such as the arcuate channel 34.

The sprocket 14 is preferably a conventional sprocket having a plurality of teeth for engaging the chain 18. The sprocket 14 additionally preferably includes a belt mount 40 for coupling the sprocket 14 to other elements, described below, via a belt 42, linking element, or chain distinct from the chain 18. The belt mount 40 is a circular protrusion positioned coaxially upon the sprocket 14 to enable the sprocket 14 to be rotated upon actuation of the belt 42 without adversely affecting the interaction of the plurality of teeth and the chain 18. Although the sprocket 14 is described and illustrated herein as a conventional sprocket, the sprocket 14 may also be a gear, wheel, or other similar actuating element.

The sprocket 14 is preferably coupled through the belt mount 40 and belt 42 to a drive element 44. The drive element 44 is preferably a conventional gear or wheel that may include or may not include teeth. The drive element 44 is positioned in proximity to the sprocket 14 to reduce the required length of the belt 42. Additionally, the drive element 44 may be sized to form a desired ratio with the sprocket 14 to facilitate rotation of the sprocket 14 and extension and retraction of the arm segment 16. The drive element 44 is coupled with a drive shaft 46 that extends through one of the passthroughs 36 to enable coupling with other arm 10 elements described below.

The drive element 44, and preferably the drive shaft 46, is coupled with a motor 48 to provide power for the arm 10. The motor 48 is preferably coupled with the base 12 for support, such as by being mounted to the left side 32 of the base 12 as shown in FIG. 3. However, the motor 48 may be discrete from the arm 10 and the base 12, such as by being a component of the dispensing system 200 or other apparatus, to reduce the size and complexity of the arm 10.

The motor generally responds to received control signals by rotating the drive shaft 46, and thus the drive element 44, in one of two directions to actuate the belt 42. The illustrated motor 48 is preferably a servo motor that secures to the base 12 via a plurality of motor fasteners. Electrical contacts provide a path for power and control signals to be communicate to and from the motor 48. While various different types of motors may be used with the present invention, a servo motor is particularly suited for use with the robotic arm 10 because of the precision with which servo motors may be controlled via digital control signals.

The extendible arm segment 16 is coupled with the base 12 for support and maneuverability such that movement of the base 12 by the dispensing system 200 may horizontally and vertically position the arm 10 in a desired position. The extendible arm segment 16 includes a plurality of telescoping segments 50 operable for telescoping, an engagement mechanism 52 coupled to the telescoping segments 50 and operable to engage a product such as a medicament package, and a slidable arm mount 54 coupled to the telescoping segments to couple the extendible arm segment 16 to the base 12. A distal end 55 of the extendible arm segment 16 is generally comprised of the portions of the extendible arm segment 16 opposite the slidable arm mount 54. Preferably, the distal end 55 includes at least a portion of the telescoping segments 50 and at least a portion of the engagement mechanism 52. However, the extendible arm segment 16 may be comprised of only the engagement mechanism 52 such that the telescoping segments 50 and slidable arm mount 54 need not be utilized in all embodiments. In such embodiments, the distal end 55 generally comprises a portion of the extendible arm segment 16 opposite the coupling location of the base 12 and the extendible arm segment 16.

The plurality of telescoping segments 50 include a first end 56 for coupling with the engagement mechanism 52 and a second end 58 for coupling with the slidable arm mount 54. Preferably, the telescoping segments 50 include a plurality of concentrically configured cylindrical segments operable for telescoping extension or retraction upon application of an axial force. The segments positioned in proximity to the second end 58 preferably have a larger diameter than the segments positioned in proximity to the first end 56 to provide support to the extendible arm segment 16.

As illustrated in FIGS. 1-3, the extendible arm segment 16 preferably includes a pair of parallel plurality of telescoping arm segments 50 that extend between the slidable arm mount 54 and the engagement mechanism 52. Such a configuration may be desirable as it provides adequate support for the arm 10 when the engagement mechanism 52 is subjected to a load and also prevents undesirable and uncontrolled horizontal and vertical movement of the extendible arm segment 16. However, the extendible arm segmentl 6 may include any number of telescoping arm segments 50 if desired.

The engagement mechanism 52 is operable to engage a product such as a medicament package. The engagement mechanism 52 preferably includes a platform and a plurality of tines to form a fork-like structure for product engagement. The platform generally engages products and retains the products during transport, such as by providing a barrier to product movement.

The tines are substantially parallel and spaced to fit between vertical walls 204 of a shelf 206 (see FIG. 8) of the unit product storage and dispensing system 200. However, the engagement mechanism 52 may include other structures, such as grasping or clasping elements like tongs, levers, robotic hands, magnets, etc, for engaging products.

The engagement mechanism 52 preferably includes a chain-mount 60 for coupling with the chain 18. The chain-mount 60 may be mounted at a proximate end 62 of the engagement mechanism 52 towards the first end 56 of the telescoping segments 50 to enable the engagement mechanism 52 to engage products without restriction from the chain 18. The chain-mount 60 may comprise a looping element to enable a portion of the chain 18 to snap or loop through the chain-mount 60 for securement. However, the chain-mount 60 may be mounted elsewhere on the arm 10, such as on any portion of the distal end 55 of the extendible arm segment 16.

The engagement mechanism 52 preferably has a width that generally corresponds to the width of the slot 24 such that the engagement mechanism 52 may be received by the slot 24 when the extendible arm segment 16 is in a retracted state as shown in FIG. 4. Additionally, the length of the engagement mechanism preferably corresponds to the length of the slidable arm mount 54 and the base 12 such that both the slidable arm mount 54 and the engagement mechanism 52 may be received within the slot 24 to enable the length of the arm 10 to be limited to the length of the base 12 when the extendible arm segment 16 is retracted.

The slidable arm mount 54 is coupled to the telescoping segments 50 at the second end 58 and is operable to couple the extendible arm segment 16 to the base 12. Specifically, the slidable arm mount 54 is slidably received in the slot 24 formed on the top 22 of the base 12. The slidable arm mount 54 may have one or more grooves, channels, and/or reciprocal slots to securely engage the slot 24 in a manner that prevents the slidable arm mount 54 from inadvertently disengaging from the slot 24. For example, the slidable arm mount 54 may include opposed grooves positioned on each side of the slidable arm mount 54 to engage the generally L-shaped flanges of the slot 24.

The slidable arm mount 54 preferably couples with the telescoping segments 50 by receiving at least a portion of the telescoping segments 50 in at least one cavity 64. In embodiments where the extendible arm segment 16 includes a parallel pair of plurality of telescoping segments 50, the slidable arm mount 54 preferably includes a pair of cavities 64 to at least partially receive each plurality pair of telescoping segments 50.

The length of the slidable arm mount 54 generally corresponds to the length of the telescoping segments 50 in a compressed state, as when the telescoping segments 50 are in a retracted state, such that a substantial portion of the telescoping segments 50 may be housed in the cavities 64 by housing approximately all the telescoping segments 50 of one parallel pair of plurality if telescoping units 50 within one cavity 65. Such configuration enables the extendible arm segment 16 to be compacted such that both the slidable arm mount 54 and engagement mechanism 52 may be received within the slot 24 to enable the length of the arm 10 to be generally limited to the length of the base 12.

The slidable arm mount 54 additionally includes a longitudinal channel 66 that enables the chain 18 to pass from the sprocket 14, through the opening 26 and slidable arm mount 54, to the engagement mechanism 52. The longitudinal channel 66 is preferably positioned on a bottom side 68 of the slidable arm mount 54 to protect the chain 18 and prevent the chain from distending, bending, or otherwise moving apart from the arm 10. Furthermore, the longitudinal channel 66 enables at least a portion of the chain 18 to be housed within the longitudinal channel 66 when the extendible arm segment 16 is in a retracted state such that both the slidable arm mount 54 and engagement mechanism 52 may be positioned in the slot 24 without interference from the chain 18.

The chain 18 couples the sprocket 14 and the extendible arm segment 16, preferably at the distal end 55 of the extendible arm segment 16, such that rotation of the sprocket 14 causes movement of the chain 18 and extension of the extendible arm segment 16. More preferably, the chain 18 couples the sprocket 14 and the engagement mechanism 52 through chain-mount 60. The chain 18 may be a conventional chain or any rigid connecting element, such as a rigid belt, line, wire, or other linking element, that is operable to extend or retract the extendible arm segment 16 upon rotation of the sprocket 14. Additionally, the length of the chain 18 generally corresponds to the desired length of the arm 10 when the extendible arm segment 16 is fully extended as the length of the chain 18 and the length of the extended telescoping segments 50 generally determines the length of the arm 10 when extended.

Figure 7:
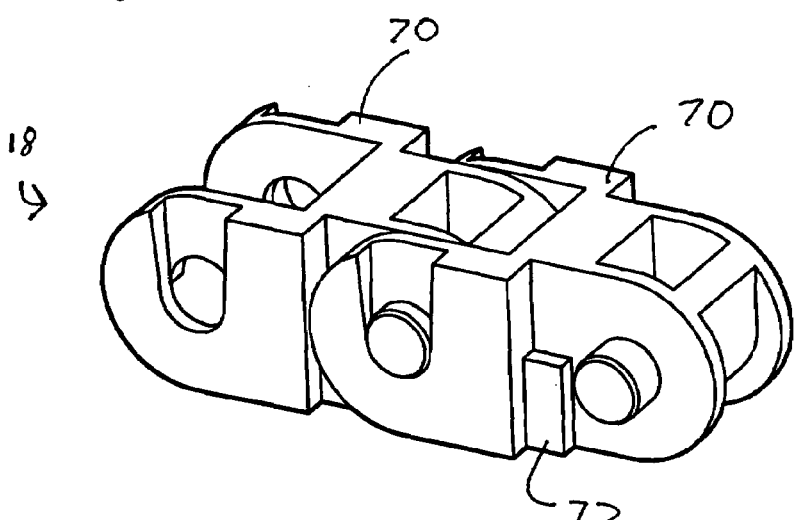
FIG. 7 is a perspective view of a link utilized by various embodiments of the present invention.

As shown in FIG. 7, the chain 18 preferably includes a plurality of links 70 and a plurality of stops 72 that interact with the links 70 to restrict bending of the chain 18. In various embodiments, the chain 18 may be formed by snapping the plurality of links 70 together. The stops 72 are preferably integral with the links 70 such that the links 70 and stops 72 are formed within the same material. However, the stops 72 may be discrete from the links 70, such as in an embodiment where the stops 72 may be snapped into the links 70 to restrict bending of the chain 18 in the desired manner.

The stops 72 are preferably positioned on the links 72 to prevent the bending of the chain 18 in a single direction. For example, the stops 72 enable conventional bending of the chain 18 in a first direction but restrict, and generally prohibit, bending of the chain a second direction opposite to the first. To enable such functionality, the stops 72 may be positioned towards a lateral axis of each link 70 slightly longitudinally offset from a center of each link 70 to enable rotation of a neighboring link 74 in the first direction but prohibit rotation of the neighboring link 74 in the second direction due to the abutting of the stop 72 and the neighboring link 70.

In various embodiments, the stops 72 are positioned on the links 72 to prevent the chain 18 from bending vertically downward from the arm 10. Such positioning of the stops 72 may be desirable as it enables the chain 18 to provide sufficient force to the engagement mechanism 52 for movement without bending or kinking the chain 18, while still allowing the chain 18 to bend at least partially in the opposite, upward, direction to enable the chain 18 to coil within the arcuate channel 34 as described above. Such functionality is also enabled by the positioning of the slidable arm mount 54 and longitudinal channel 66, which is operable to at least partially restrict bending and movement of the chain 18 in the opposite, upward, direction during use of the arm 10. However, the stops 72 may be positioned on an opposite side of the links 70, or on both sides of the links 70, to provide any degree of desired restriction on bending.

The arm 10 may additionally include other elements, such as a sensor 74 to detect the position of the arm 10, the position of the extendible arm segment 16, the position of various products, the status of engagement of the engagement mechanism 52 with various products, etc. The sensor 74 generally interfaces with a control system 208 of the storage system 200 (see FIG. 8) to the robotic arm 10 by indicating any combination of sensed attributes, including those described above. The sensor 74 is preferably coupled with the base 12, such as by being mounted on the left side 32 to enable the sensor 74 to sense the various states of the arm 10 and the status of nearby products. The sensor 74 may additionally comprise an encoder operable to assign an exact, unique position value to each angular position of the sprocket 14 and, thus, to each position of extendible arm segment 16. Utilization of encoder is often desirable as it facilitates the determination of sensed attributes, such as arm 10 position, by determining only the angular position of the sprocket 14.

Figure 8:
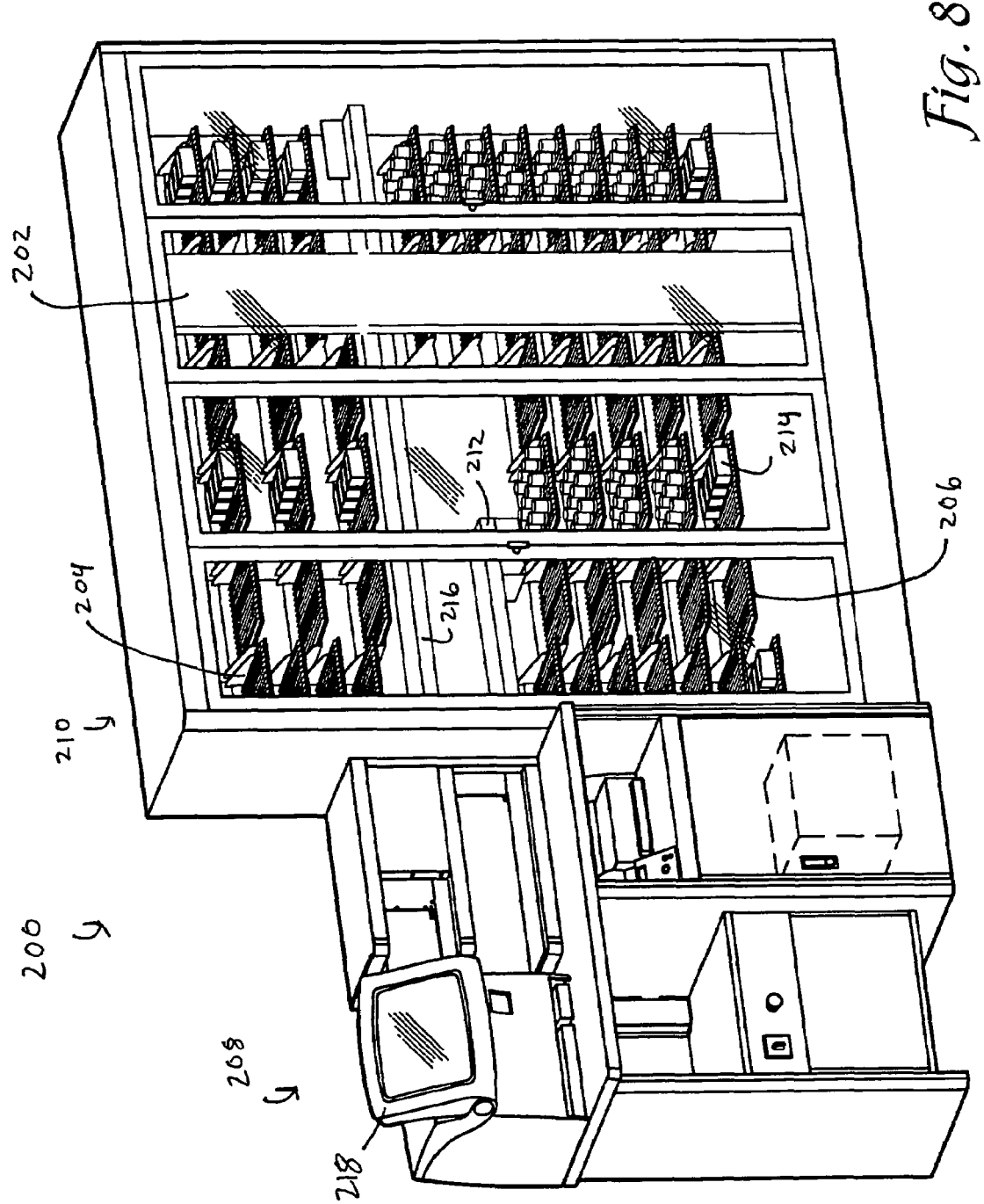
FIG. 8 is a perspective view of a dispensing system operable to utilize the arm of FIGS. 1-6.

The robotic arm assembly 10 is preferably used as part of the transport storage system for pharmaceutical unit of use dispenser 200 illustrated in FIG. 8. The storage system 200 is described in detail in co-pending U.S. patent application "FORK BASED TRANSPORT STORAGE SYSTEM FOR PHARMACEUTICAL UNIT OF USE DISPENSER", incorporated by reference above. In addition to the drive assembly 202, shelves 206, and control system 208 described above, the storage system 200 broadly includes a cabinet 210 for enclosing the shelves 206; an infeed conveyor 212 for transporting products 214 into the cabinet 210; and an outfeed conveyor 216 for transporting the products 214 out of the cabinet 210. The drive assembly 202 is moveable within the cabinet 210 and transports the products 214 between the shelves 206 and the infeed and outfeed conveyors 212,216. The control system 208 controls operation of the conveyors 212,216 and the drive assembly 202 in response to prescriptions received from a host computer 218. The drive assembly 202 and the robotic arm 10 together comprise a transporter. The structure and function of each of these elements is described in detail in the above-referenced co-pending patent application.

In use, an operator may use the control system 208 to select from various operating modes, including load only, store only, dispense only, dispense and store, and dispense and load. In the load only mode, the system 200 receives products 214 to be stored in the cabinet 210 and keeps them on the infeed conveyor 212. In the store only mode, the system takes products off the infeed conveyor 212 and puts them on the shelves 206. In the dispense only mode, the system 200 takes products off the shelves 206 and puts them on the outfeed conveyor 216 in response to prescriptions received from the host computer 218. In the dispense and store mode, dispensing of products takes precedence over storing of products. If the system 200 has prescriptions to dispense, it completes dispensing the products 214 in response to all of the scripts that it can fill and then performs storing of the products 214. If a prescription comes in during storing, storing is postponed, and the prescription is filled. In the dispense and load mode, the system 200 dispenses and loads simultaneously because loading does not require use of the drive assembly 202. In the maintenance mode, the operator can selectively eject products from the cabinet 210.

Figure 5:
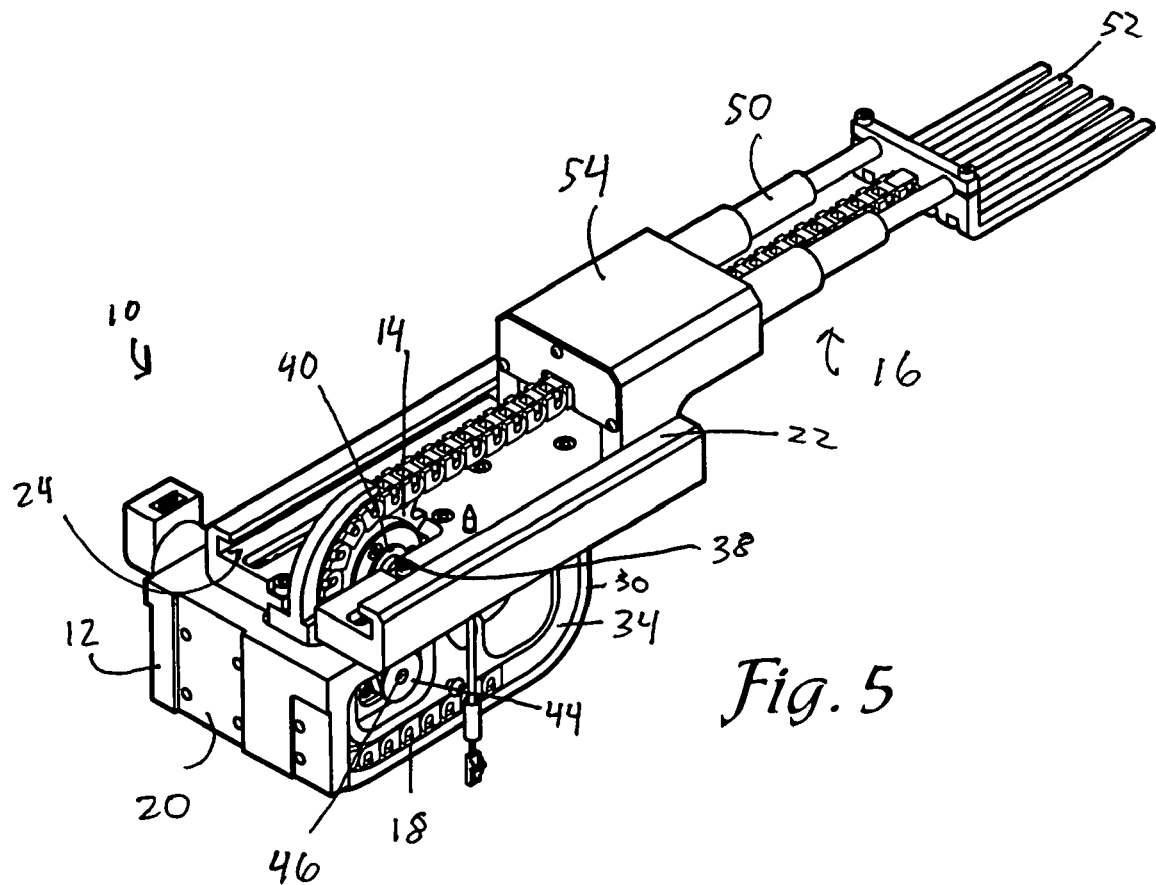
FIG. 5 is a perspective view of the arm of FIGS. 1-4 showing the arm in a partially extended position.
Figure 6:
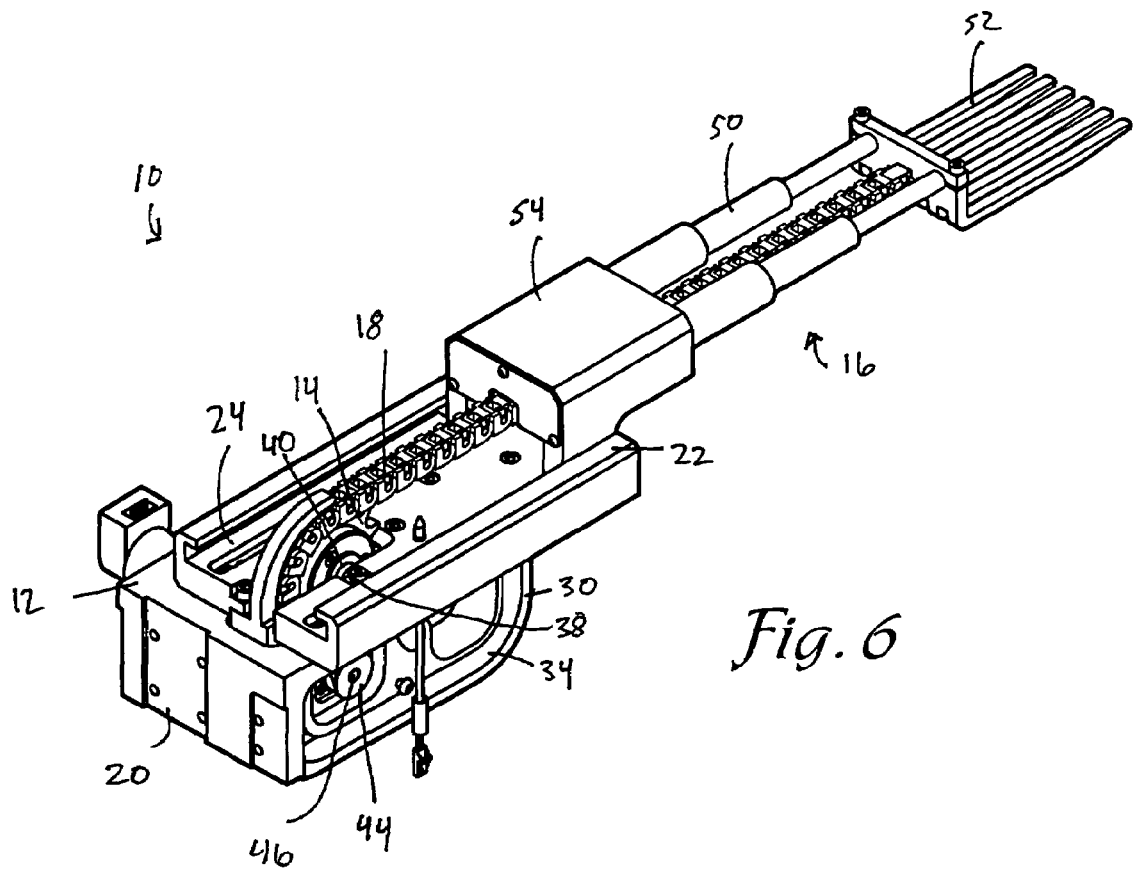
FIG. 6 is a perspective view of the arm of FIGS. 1-5 showing the arm in a fully extended position.

In operation, the arm 10 is operable to generally include three position states, a generally retracted position as shown in FIG. 4, a partially extended position as shown in FIG. 5, and a fully extended position as shown in FIG. 6. In the generally retracted position, the chain 18 is retracted within the housing such that both the slidable arm mount 54 and engagement mechanism 52 are substantially housed within the slot 24. The arm 10 maintains the retracted position while it is idle and while it is transporting a product to or from a product shelf. It will be appreciated that while the arm 10 is in the retracted position it requires little longitudinal operating room, that is, it requires little operating room in the direction of its longitudinal axis as the length of the retracted arm 10 is generally similar to the length of the base 12. Dedicating less space to operation of the arm 10 allows a user to dedicate more space to product shelves (i.e., deeper shelves), or to reduce the overall depth of the cabinet 210.

In the partially extended position, the extendible arm segment 16 is at least partially extended towards a product. To accomplish this, the motor 48 receives a control signal from the dispensing system 200. In response, the motor 48 rotates the drive element 44 in a first direction, clockwise for example, a desired amount as indicated by the control signal. The rotation of the drive element 44 imparts rotational motion to the sprocket 14 due to the coupling of the drive element 44 and the sprocket 14 through the belt 42. Rotational motion of the sprocket 14 in the first direction, clockwise for example, moves the chain 18 at least partially from the arcuate channel 34 due to the coupling of the chain 18 and the sprocket 14. The movement of the chain 18 at least partially out of the arcuate channel 34 extends the engagement mechanism 52 towards the product due the general rigidity of the chain 18 and the coupling of the chain 18 and the engagement mechanism 52.

In response to the movement of the chain 18 and at least partial extension of the engagement mechanism 52, the slidable arm mount 54 at least partially slides towards the product within the slot 24 and/or the telescoping arm segments 50 at least partially telescope towards the product due to the coupling of these elements to the engagement mechanism 52. The sensor 74 may also detect the amount of extension of the extendible arm segment 16 and vary the control signal, and motor operation, accordingly. During extension, downward bending of the chain 18 is limited by the stops 72 and upward bending of the chain is limited by the longitudinal channel 66 of the slidable arm mount 54, as is described above.

To fully extend the arm, the motor 48 rotates the drive element 44 and sprocket 14 to extend the chain 18 such that the slidable arm mount 54 slides forward until slot stops 28 prevent further sliding of the slidable arm mount 54 and the telescoping segments 50 are fully telescoped to due pulling caused by extension of the engagement mechanism 52. Thus, in various embodiments, rotation of the sprocket 14 by the motor 48 causes the engagement mechanism 52 to extend, the slidable arm mount 54 to slide forward until restricted by the slot stops 28, and then the telescoping segments 50 to telescope until fully extended. However, in embodiments lacking the slidable arm mount 54 or telescoping segments 50, the extension of the extendible arm segment 16 may be limited by the length of the chain 16 or by stops positioned in the arcuate channel 34 or in proximity to the base.

To retract the arm 10, the dispensing system 10 sends a control signal to the motor 48 to rotate the drive element 44 in a second direction opposite the first direction, such as counterclockwise. Rotation of the drive element 44 in the second direction rotates the sprocket 14 in the second direction due to coupling the drive element 44 and sprocket 14 through the belt 42. The resulting rotation of the sprocket 14 in the second direction, counterclockwise for example, imparts movement to the chain 18 towards the arcuate channel 34 to cause the chain 18 to at least partially retract into the base 12 and arcuate channel 34.

The return movement of the chain 18 into the arcuate channel 34 retracts the engagement mechanism 52 due to the coupling of the chain 18 and engagement mechanism 52. Retraction of the engagement mechanism 52 retracts the extendible arm segment 16 by causing the telescoping segments 50 to telescope inwardly due to the axial pushing force applied by the retracting engagement mechanism 52 and by causing the slidable arm mount 54 to slide rearwardly away from the product due to forces applied by the inwardly telescoping segments 50. Rearward sliding of the slidable arm mount 54 is restricted by the slot stops 28 to enable the extendible arm segment 16 to be compactly maintained within the slot 24.

To engage a product, the engagement mechanism 52 is extended toward a back of the cabinet 210, and under a product 214. Once the engagement mechanism 52 is at least partially under the product 214, such as by positioning the tines under the product 214, the drive assembly 202 lifts the arm 10 upward, or toward a top of the cabinet 210, to lift the engagement mechanism 52 and engage the product 214. With the product 214 resting on the engagement mechanism 52 the arm 10 may be retracted to clear vertical walls 204 of the product shelves 206, enabling the drive assembly 202 to move the arm 10 vertically, laterally, and/or horizontally to transport the product 214 to a new location.

It will be appreciated that alignment of the engagement mechanism 52 and product 214 is simplified due to the configuration of the present invention as the extendible arm segment 16 is operable only for longitudinal movement towards the product 214 and is inoperable for independent lateral or horizontal movement. Thus, the arm 10 may rely upon the drive assembly 202 to accurately longitudinally and laterally position the base 12 for extension of the extendible arm segment 16 without requiring the precise lateral or horizontal control of the extendible arm segment 16 itself. Such functionality additional simplifies the structure and computation required by the dispensing system 200 to accurately position the arm 10.

Having thus described the preferred embodiment of the invention, what is claimed as new and desired to be protected by Letters Patent includes the following:

1. A robotic arm for transporting products in a product storage and dispensing system, the arm comprising:
   a base operable to couple the arm to the dispensing system;
   a sprocket coupled with the base;
   an extendible arm segment coupled with the base; and
   a chain coupled with the sprocket and a distal end of the extendible arm segment such that rotation of the sprocket causes movement of the chain and extension of the extendible arm segment, the chain including a plurality of stops to restrict bending of the chain.

2. The robotic arm of claim 1, wherein rotation of the sprocket in a first direction causes movement of the chain and extension of the extendible arm segment and movement of the sprocket in a second direction causes reverse movement of the chain and retraction of the extendible arm segment.

3. The robotic arm of claim 1, wherein in the base includes an arcuate channel operable to house at least a portion of the chain when the extendible arm segment is retracted.

4. The robotic arm of claim 1, wherein the extendible arm segment includes a plurality of telescoping segments operable to outwardly telescope upon extension of the extendible arm segment.

5. The robotic arm of claim 1, wherein the extendible arm segment includes a slidable arm mount operable to couple the extendible arm segment to the base.

6. The robotic arm of claim 5, wherein the base additionally includes a slot operable to at least partially house the slidable arm mount and the engagement mechanism when the extendible arm segment is retracted.

7. The robotic arm of claim 1, further including a sensor coupled with the base and operable to detect the position of the arm.

8. The robotic arm of claim 1, further including a motor coupled with the base and operable to rotate the sprocket.

9. A robotic arm for transporting products in a product storage and dispensing system, the arm comprising:
   a base including an arcuate channel, the base being operable to couple the arm to the dispensing system;
   a sprocket coupled with the base;
   a motor coupled with the sprocket and operable to rotate the sprocket in a first direction and a second direction;
   an extendible arm segment coupled with the base, the extendible arm segment including
      a plurality of telescoping segments operable to inwardly and outwardly telescope, and
      an engagement mechanism coupled to the telescoping segments and operable to engage a product; and
   a chain including a plurality of stops to restrict bending of the chain, the chain coupled with the sprocket and the engagement mechanism such that
      rotation of the sprocket in the first direction causes movement of the chain and outward telescoping of the telescoping segments to extend the extendible arm segment, and
      rotation of the sprocket in the second direction causes reverse movement of the chain and inward telescoping of the telescoping segments to retract the extendible arm segment, the chain being at least partially housed in the arcuate channel when the extendible arm segment is retracted.

10. The robotic arm of claim 9, wherein the extendible arm segment includes a slidable arm mount operable to couple the extendible arm segment to the base.

11. The robotic arm of claim 10, wherein the base additionally includes a slot operable to at least partially house the slidable arm mount and the engagement mechanism when the extendible arm segment is retracted.

12. The robotic arm of claim 10, wherein rotation of the sprocket in the first direction causes movement of the chain, sliding of the slidable arm mount, and extension of the extendible arm segment.

13. The robotic arm of claim 9, further including a sensor operable to detect the position of the arm.

14. A robotic arm for transporting products in a product storage and dispensing system, the arm comprising:
   a base including an arcuate channel and a slot, the base being operable to couple the arm to the dispensing system;
   a sprocket coupled with the base;
   a motor coupled with the sprocket and operable to rotate the sprocket in a first direction and a second direction;
   an extendible arm segment including
      a plurality of telescoping segments operable to inwardly and outwardly telescope, the plurality of telescoping segments having a first end and a second end,
      an engagement mechanism coupled to the telescoping segments at the first end and operable to engage a product, the engagement mechanism housed at least partially in the slot when the extendible arm segment is retracted, and
      a slidable arm mount coupled to the telescoping segments at the second end and operable to couple the extendible arm segment to the base, the slidable arm mount positioned at least partially in the slot for sliding therein; and
   a chain including a plurality of stops to restrict bending of the chain, the chain being coupled with the sprocket and the engagement mechanism such that
      rotation of the sprocket in the first direction causes movement of the chain, forward sliding of the slidable arm mount, and outward telescoping of the telescoping segments to extend the extendible arm segment, and
      rotation of the sprocket in the second direction causes reverse movement of the chain, rearward sliding of the slidable arm mount, and inward telescoping of the telescoping segments to retract the engagement mechanism, the chain being at least partially housed in the arcuate channel when the extendible arm segment is retracted.

15. The robotic arm of claim 14, further including a sensor operable to detect the position of the arm.

16. The robotic arm of claim 14, wherein the slot includes a stop for restricting movement of the slidable arm mount and the telescoping segments enable extension of the extendible arm segment after the stop restricts movement of the slidable arm mount.

17. The robotic arm of claim 14, wherein the engagement mechanism includes a plurality of tines for engaging the product and a mount for coupling with the chain.

* * * * *